United States Patent [19]
Odier

[11] 3,767,015
[45] Oct. 23, 1973

[54] BRAKING ROTATING COMPONENTS AND COOLING MEANS

[75] Inventor: Jean Alfred Odier, Antony, France

[73] Assignee: Societe Anonyme Francaise du Ferodo, Paris, France

[22] Filed: Aug. 26, 1971

[21] Appl. No.: 175,199

[30] Foreign Application Priority Data
Sept. 4, 1970  France .................... 7032180

[52] U.S. Cl. ........ 188/71.6, 188/264 D, 188/264 R, 192/113 R, 192/113 A
[51] Int. Cl. ........................................... F16d 65/84
[58] Field of Search .................. 188/264 R, 264 A, 188/264 AA, 264 D, 71.6; 192/113 A, 113 B, 113 R

[56] References Cited
UNITED STATES PATENTS
2,764,265  9/1956  Runner .................... 188/264 A
2,944,618  7/1960  Schjolin .................... 188/264 D
2,788,870  4/1957  Heck ........................ 188/264 P
2,986,238  5/1961  Eaton ....................... 192/113 B X
3,217,844  11/1965  Nelson et al. ............. 192/113 A X Primary Examiner—George E. A. Halvosa
Attorney—Robert J. Patch and Irving S. Thompson

[57] ABSTRACT

Apparatus having a rotatable component such as a brake disc has braking means capable of applying a braking couple to the rotating component, a heat-collecting shoe for absorbing heat from the component generated by the braking means, and control means operable to urge the shoe towards the rotating component, the control means being operable independently of the braking means.

9 Claims, 8 Drawing Figures

BRAKING ROTATING COMPONENTS AND COOLING MEANS

BACKGROUND OF THE INVENTION

1. Field of the Invention

The present invention relates to any apparatus with a rotating component which includes braking means capable of applying a braking couple to the said rotating component.

Examples of such apparatus include a disc brake, a drum brake, a brake pulley or an eddy current brake, or any decelerator or like device, and the invention relates to the application of such a brake, decelerator or such device to automobile vehicles, machine tools, trains or to other apparatuses.

However, for simplicity, the subject of the present invention will hereafter be presented by particularly referring to its application to brakes.

2. Description of the Prior Art

In all types of brakes or the like, and in all cases of the application of these, one of the major problems to be solved is to ensure that in operation the rotating component subjected to the braking means should be correctly cooled.

In effect, even in a case where this rotating component in operation reaches a temperature which is not critical, that is to say a temperature at which undesired phenomena occur, such as those called "vapour lock" or "fading," which are capable of at least temporarily affecting the efficiency, it is still of value to reduce this temperature so as to reduce wear of this rotating component as well as of the associated means of braking, and hence to increase their working life.

Where one is dealing in particular with a brake in which the means of braking comprise shoes applied to the rotating component, there is value in reducing to the maximum extent the temperature reached by these shoes in operation, in order especially to reduce their wear and to achieve a more uniform level of friction of the shoes.

It has already been proposed, for this purpose, to combine the means of braking with at least one special shoe called a heat-collecting shoe.

However, in the embodiments hitherto known, the heat-collecting shoe is carried by the same support as the support of the means of braking and is most frequently overlapped therwith. This results in relatively complicated and costly apparatus.

The aim of the present invention is to overcome these disadvantages.

SUMMARY

According to the present invention, there is provided apparatus having a rotating component such as a brake, decelerator or the like, including braking means capable of applying a braking couple to the rotating component, a heat-collecting shoe, means for control of said shoe capable of urging said shoe towards the said rotating component, characterised in that the means of control of the said heat-collecting shoe are independent of the said braking means.

The independence of the braking means from the heat-collecting shoe results in greater ease of construction and in greater flexibility in operation as compared to the previously known embodiments. Furthermore, it leads to a more rational arrangement of the elements in question, those involved in heating the rotating component being advantageously separated from those involved in cooling the latter.

According to a first possible embodiment, the means of control of the heat-collecting shoe apply the latter against the rotating component which is to be cooled.

In this case, the heat-collecting shoe according to the invention virtually does not participate in the braking, the pressure with which it is applied to the rotating component being chosen to be sufficiently low that, taking the characteristics of this shoe into account, the tangential frictional force which results, that is to say the product of the coefficient of friction of this shoe and its application pressure, is restricted to a fraction of the tangential braking force developed by the associated means of braking, this fraction being at most 50 percent and preferably less than 10 percent, especially in a case where this brake serves as equipment on a touring vehicle.

In other words, since the couple and the tangential force are proportional, the frictional couple due to the heat-collecting shoe according to the invention is preferably only a fraction of the braking couple applied to the rotating component in question.

According to a second possible embodiment, the heat-collecting shoe according to the invention remains at a distance from the rotating component to be cooled.

In either case, this heat-collecting shoe absorbs at least a part of the heat which is in this rotating component, and the heat thus absorbed by this shoe is removed by the latter to the surrounding medium, either directly or via a cooling fluid which is, for example, provided within the said shoe; in this latter case, it is advantageously possible to be less demanding as regards the quality of the material of which the shoe employed consists.

However, this material is preferably chosen so as to have a low coefficient of friction, in any case less than 0.3, a good heat conductivity and a good specific heat by volume.

As regards the means of control of the heat-collecting shoe according to the invention, they can, for example, be independent.

They are, for example, a spring which pulls this shoe in the direction of the component to be braked, or a permanent magnet embedded in the shoe itself.

According to different variants, the means of control of the heat-collecting shoe according to the invention are regulated and are, for example mechanical, electrical or electro-magnetic means, or fluidic means, that is to say hydraulic or pneumatic means, under pressure or under pressure reduction.

In the latter case, such regulated means of control are preferably coupled to means of control of the braking means in question and are dependent on a timing device which is capable of regulating, during each braking process, the period for which the device acts.

As a result of this arrangement, the heat-collecting shoe according to the invention is not permanently applied against the associated rotating component; it only becomes involved at the time of the individual braking processes and can continue to act for any chosen period.

In any case, experiments have shown that a heat-collecting shoe according to the invention made it possible significantly to lower the temperature reached in operation by the rotating component concerned, and also made it possible significantly to reduce the wear of the various components involved.

The use of a heat-collecting shoe according to the invention has the further advantage of opening up new avenues of use of materials, such as, for example, stainless steel, which because of their sensitivity to high temperatures have hitherto been unusable for the manufacture of this rotating component.

DESCRIPTION OF THE PREFERRED EMBODIMENTS

Figure 1:
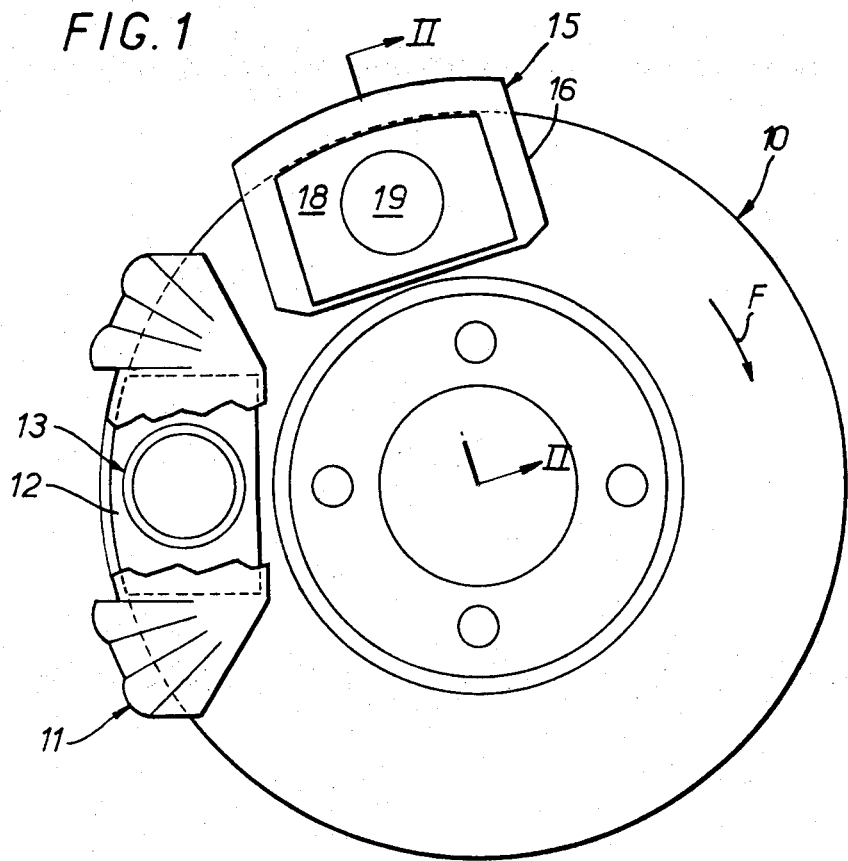
FIG. 1 is a side view of a brake according to the invention.
Figure 2:
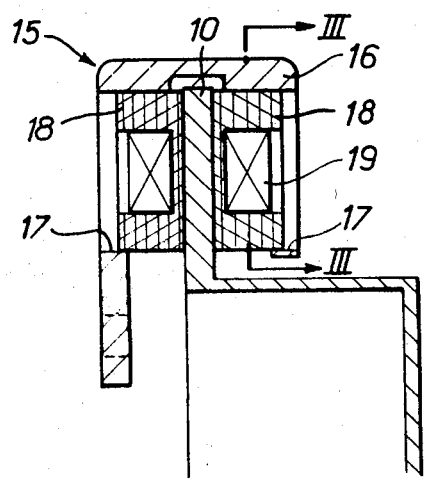
FIG. 2 is a partial cross-section of this brake, along line II—II of FIG. 1.

FIGS. 1 and 2 illustrate the application of the invention to a disc brake, that is to say to a brake in which the rotating component to be braked is a disc 10.

In a known manner, the means of braking associated with such a disc comprise in the example shown, a supporting stirrup 11 straddling the disc 10, two brake shoes 12 arranged respectively on the two sides of the disc 10, and a control block 13.

Such an arrangement is in itself well known; it has hence only been schematically represented in the figures and will not be described in detail below.

According to the invention, the brake is equipped with a heat-collecting device 15 which, in the example shown, is arranged immediately adjacent the braking stirrup 11, in the direction of rotation F of the disc 10, and possesses a second supporting stirrup 16 engaging on the disc 10.

The stirrup 16 is, for example, a fixed stirrup of which each of the arms is hollowed out to provide a seat 17 for a heat-collecting shoe 18, to slide.

Figure 3:
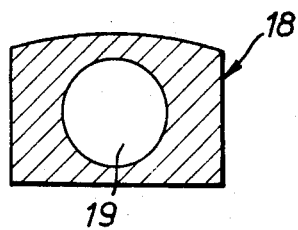
FIG. 3 is a cross-section of the heat-collecting shoe with which this brake is equipped, along line III—III of FIG. 2.

In the embodiment illustrated by FIGS. 1 to 3, a permanent magnet 19 is embedded in the heat-collecting shoe 18, which ensures that this shoe is permanently applied against the braking disc 10.

According to a different embodiment (not shown), this permanent magnet is replaced by a spring which rests against the stirrup 16.

Such magnets or such springs form means of control associated with the heat-collecting shoes according to the invention, to ensure that the latter are applied against the disc 10.

Figure 6:
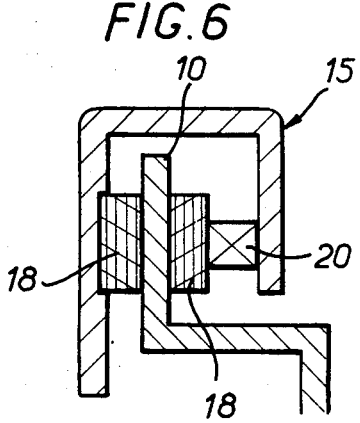
FIG. 6 is a view similar to FIG. 2 and relates to a different embodiment.

According to the different embodiment represented in FIG. 6, the stirrup 16 is mounted so as to float relative to the disc 10, and the heat-collecting shoes 18 are associated with a control block 20 which acts directly on one of these shoes and indirectly on the other, via the stirrup 16.

For example, one may be dealing with a mechanical, electrical, electro-magnetic or fluidic control block, of the type of those usually employed for controlling braking means.

In any case, whether the stirrup 16 is fixed or floating, the control block 20 can be regulated so as only to apply the heat-collecting shoes 18 intermittently against the disc 10, as will be explained subsequently by the various embodiments.

In FIGS. 2 and 6, the heat-collecting shoes 18 do not possess any internal cooling system; this cooling takes place by heat exchange with the surrounding medium.

Figure 5:
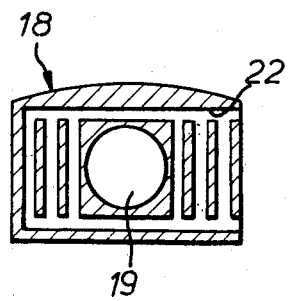
FIG. 5 is a view similar to FIG. 3 and relates to a different embodiment of the heat-collecting shoe.

As a variant, and as shown schematically in FIG. 5, which illustrates a different embodiment of the heat-collecting shoe shown in FIG. 3, such a heat-collecting shoe is hollowed out with at least one recess for a cooling fluid; these are formed as internal channels 22 which allow such a fluid to be circulated therein.

Experiments have shown that such heat-collecting shoes made it possible efficiently to remove a part of the heat which the disc 10 collects during braking, and this heat is removed either directly by contact with the atmosphere or indirectly through the cooling fluid which may circulate in these shoes; the experiments have also shown that a circulation of cooling fluid was particularly desirable where the heat-collecting shoes 18 are permanently applied.

Figure 4:
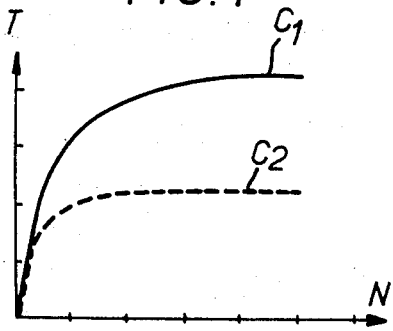
FIG. 4 is a diagram illustrating the results obtained with such a heat-collecting shoe.

The results of these experiments, several of which will be given below, are illustrated by the diagram in FIG. 4.

In this diagram, the temperature T of the disc 10 is plotted as the ordinate, as a function of a number N of applications of the brake, plotted as the abscissa.

The curve C1, shown as a solid line, indicates the course of the curve representing this temperature T in the absence of the heat-collecting device 15 according to the invention, and the curve C2, shown as a broken line, indicates the course of the curve representing this same temperature if this heat-collecting device is brought into action.

More precise values of this temperature will be given below with reference to the various sets of experiments which have been carried out.

In all these series of experiments, the braking stirrup 11 applies a braking couple of 80 deca-newton/m to the disc 10 every 90 seconds. The period of braking is 7 seconds and this braking is followed by a stoppage time of 7 seconds.

Under these conditions, the temperature of the disc 10 becomes stabilised at about 430° C after 25 brakings, and the temperature of the linings of the brake shoes 12 rises and becomes stabilised at 190° C.

The heat-collecting device 15 according to the invention is hydraulically controlled and develops a frictional couple of the order of 1 deca-newton/m; its shoes 18 have a lining of the type sold under the trade name of FERODO 437, the coefficient of friction of which is between 0.15 and 0.2.

These shoes are applied intermittently to the disc 10 for 20 seconds at each braking, the initial moment of application of these shoes coinciding with the start of the braking.

Under these conditions, the temperature of the disc 10 becomes stabilised at about 390° C instead of 430°

C previously; the improvement in heat conditions manifests itself from 300° C onwards.

At the same time, the temperature of the linings of the brake shoes 12 is lowered to 160° C.

SECOND SERIES OF EXPERIMENTS

The heat-collecting device according to the invention is mechanically controlled and develops a very low frictional couple of the order of 0.1 to 0.2 deca-newton/m; its shoes 18 are identical to those previously tested and are applied for about 20 seconds for each braking, the initial moment of application of these heat-collecting shoes coinciding with the start of braking.

It is found that the heat-collecting device according to the invention is thus efficient from about 200° C onwards and the temperature of the disc 10 stabilises itself at about 380° C.

THIRD SERIES OF EXPERIMENTS

The heat-collecting shoes employed during the second series of experiments are replaced by aluminium shoes cooled by a stream of water and the time of application of these aluminium shoes against the disc 10 is increased to about 30 seconds.

It is found that under these conditions the heat-collecting device according to the invention is still more efficient than above; after 25 brakings, the temperature of the disc stabilises itself at about 220° C.

It is noted at the same time that under these conditions the wear of the linings of the brake shoes 12 is reduced by about 30 percent relative to the case where the stirrup 11 alone is involved.

Figure 7:
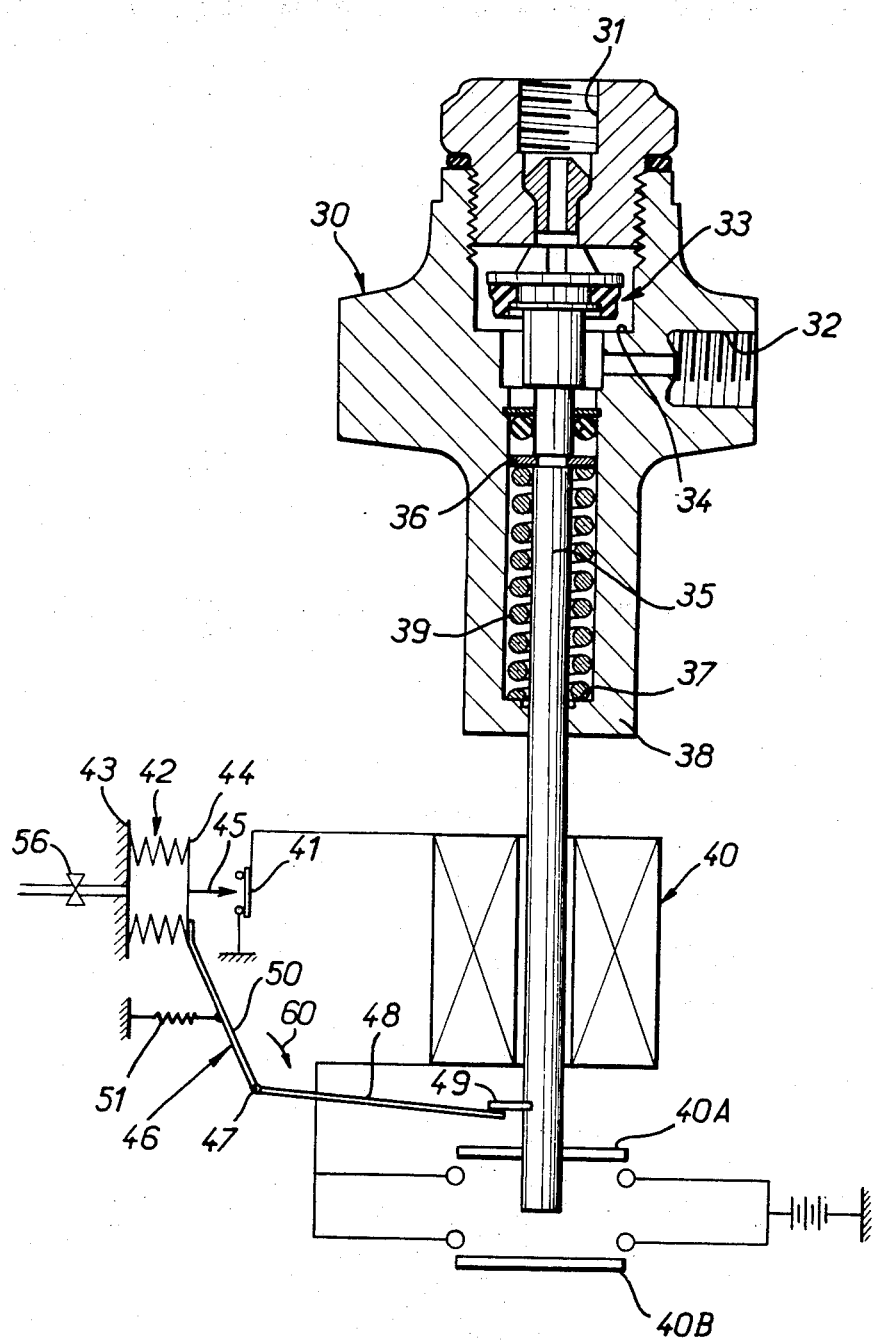
FIG. 7 is an axial cross-section of the means of control which it is possible to combine with a heat-collecting shoe according to the invention, in cooperation with means of timing.

FIG. 7 schematically illustrates a possible embodiment of the means of control which can be associated with the control block 20 of the heat-collecting device according to the invention, in order to regulate its participation, where this control block 20 is a hydraulic block.

In FIG. 7, the general reference 30 denotes a pressure restrictor having an inlet attachment 31 intended to be connected to the control circuit of the braking stirrup 11 associated with the disc 10, and an outlet attachment 32 intended to be connected to the control block 20 of the heat-collecting device according to the invention.

Between the inlet attachment 31 and the outlet attachment 32 the pressure restrictor 30 has a valve 33 designed to co-operate with a valve seat 34.

The valve 33 is coupled to a rod 35 carrying a circlip 36, and between this circlip and a shoulder 37 of the body 38 of the pressure restrictor 30 is interposed a spring 39 which pushes the valve 33 open.

The rod 35 which is firmly fixed to the valve 33 forms the plunger core of an electromagnet 40, in the feed circuit of which are interposed firstly a contact 40A, parallelled by a self-feed contact 40B, and secondly a contact 41 controlled by a bellows 42.

This bellows has a fixed face 43, and its free face 44 carries a finger 45 which is intended to control the contact 41.

The bellows 42 are furthermore controlled by a bent lever 46 which is mounted so as to pivot at 47; this lever 46 has firstly an arm 48 subjected to the action of a finger 49 carried by the rod 35 which is firmly fixed to the valve 33, and secondly an arm 50 to which is coupled a return spring 51.

The bellows 42 have a calibrated orifice 56 through which their internal volume communicates with the atmosphere.

At rest, and as shown, the valve 33 is open, as are the contacts 40A and 40B, and the contact 41 is closed; furthermore, the lever 46, of which the arm 48 is held by the stop 49 of the rod 35, keeps the bellows 42 compressed by means of its arm 50, under the pull of the spring 51.

During a braking action exerted by the shoes 12 of the stirrup 11 under the control of the block 13 which this stirrup carries, the pressure in the restrictor 30 rises sufficiently to overcome the axial force developed by the tared spring 39; the valve 33 closes, thereby isolating the control circuit of the heat-collecting device according to the invention from the braking circuit. Hence the pressure in the control circuit of the heat-collecting device from here onwards remains constant at a moderate value determined by the spring 39, for example of the order of 4 to 5 bars.

At the same time, the closing of the valve 33 has brought about the closing of the contact 40A and hence of the contact 40B, and has caused the lever 46 to swing in the direction of the arrow 60 of FIG. 7.

As a result of the contact 40B being closed, the electromagnet 40 is in an auto-excited state.

As a result of the swinging of the lever 46 the arm 50 of this lever frees the bellows 42 which progressively expands through air entering through its calibrated orifice.

This calibrated orifice is so chosen that this expansion lasts about 20 to 30 seconds, which extends beyond the duration of the majority of braking actions.

Throughout this expansion, the electromagnet 40 remains under tension through its auto-excitation contact 40B and hence keeps the valve 33 closed even if the pressure in the braking circuit has again fallen below the value at which the axial force of the tared spring 39 has been overcome.

The heat-collecting device according to the invention hence remains in action.

At the end of the expansion, the finger 45 of the bellows 42 opens the contact 41, which cuts the feed to the electromagnet 40 and hence frees the valve 33.

The heat-collecting device according to the invention from here onwards ceases to be in action.

In the case where the duration of braking extends beyond the timing thus provided by the bellows 42, the valve 33 opens when the braking pressure is relaxed but the heat-collecting device according to the invention has nevertheless played its role for a sufficiently long period.

Figure 8:
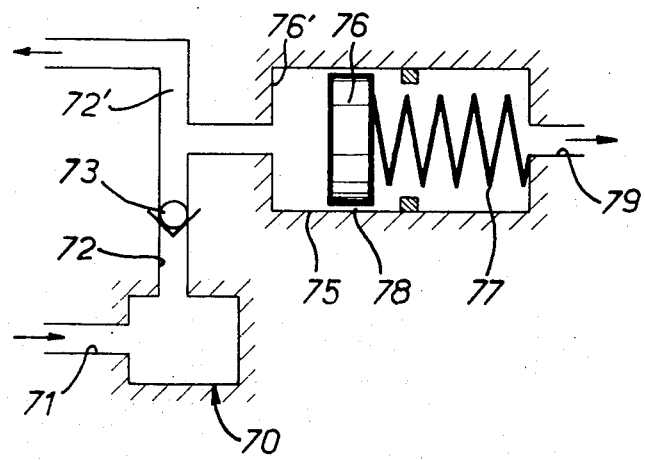
FIG. 8 is a schematic representation relating to a variant of these means of control and these means of timing.

FIG. 8 illustrates a hydraulic variant of such means of timing.

In this figure, a pressure restrictor of the type of that described above has been shown schematically at 70; this pressure restrictor 70 is connected by an attachment 71 to the control circuit of the braking stirrup 11 and through a pipeline 72, equipped with a non-return valve 73, to the control circuit of the heat-collecting device according to the invention.

A capacity of variable volume, 75, is mounted as a shunt on the pipeline 72 and comprises a piston 76 which can move in opposition to a spring 77, and this piston leaves an annular leakage passage 78. This capacity 75 is furthermore connected, at 79, to a leakage return pipeline.

When the braking pressure applied at 71 to the pressure restrictor 70 increases, its valve closes, as before which encloses a defined volume of fluid at a limited pressure in the control circuit of the heat-collecting device according to the invention. The compression of the spring 77 maintains a pressure downstream from the non-return valve 73, at 72', during which fluid 78 leaks around the piston 76 until this piston makes contact at 76'.

The period for which this pressure is maintained can be regulated by appropriately selecting the leakage clearance 78.

In all cases, and as in the embodiment shown in FIG. 7, the pressure restrictor makes it possible to couple the control of the heat-collecting device according to the invention to the control of the associated means of braking.

Of course, the present invention is not restricted to the embodiments described and shown, but encompasses any different execution.

Thus, for example, it is possible to provide several heat-collecting devices; equally, it is possible to introduce this device or these devices at any point on the rotating component which is to be cooled, even on the edge thereof. However, such a heat-collecting device is preferably placed at the hottest point on the rotating component which is to be cooled.

Furthermore, in the preceding text, the heat-collecting device is presented as being fixed; in certain applications, for example in clutches, this heat-collecting device can also be movable.

The preceding text has described a heat-collecting shoe of aluminium. It will be apparent that such a shoe can also consist of an aluminium alloy or of a composite material containing aluminium, such as an alumina-ceramic; of course, the aluminium in these various materials can be replaced by a different metal and in particular by copper and/or iron.

Preferably, however, the material of which this heat-collecting shoe consists will be chosen so as to have a low coefficient of friction, less than 0.3, a good heat conductivity, greater than 0.2 cal/cm. sec.° C, and a good specific heat by volume, greater than 0.4 cal/° C/cm$^3$.

Furthermore, the invention can be implemented by using, as the heat-collecting shoe, any of the shoes of a possible supplementary brake, such as an emergency brake or, where one is dealing with an automobile vehicle, an emergency brake or a parking brake.

I claim:

1. An apparatus comprising a rotational component, braking means for applying braking torque to the rotational component, control means for the braking means, a heat-collecting shoe for absorbing heat from the rotational component and having a coefficient of friction less than 0.3, a heat conductivity greater than 0.2 cal./cm.sec.° C. and being spaced from the braking means peripherally of the rotational component, the heat-collecting shoe developing a frictional couple with the rotational component which is at most 50 percent of the tangential braking force developed by the braking means with the rotational component, means normally holding the heat-collecting shoe out of contact with the rotational component, and means controlling the shoe for urging it towards the rotational component, said means controlling the shoe being operatively coupled to said control means for the braking means such that when said control means for the braking means is actuated to apply the braking means, the heat-collecting shoe is moved into heat-absorbing contact with the rotational component.

2. An apparatus according to claim 1, wherein said heat-collecting shoe has an internal cooling circuit, and means for circulating a cooling fluid through said cooling circuit.

3. Apparatus according to claim 1, wherein the control means for the braking means comprises a hydraulic circuit and the means controlling the shoe is a hydraulic control connected to the said circuit via a pressure restrictor.

4. Apparatus according to claim 1 wherein the heat-collecting shoe is arranged adjacent the braking means, in the direction of rotation of the rotational component.

5. Apparatus according to claim 1, wherein the rotational component is a brake disc.

6. An apparatus according to claim 1, further comprising timing means for controlling the period of operation of the heat-collecting shoe, said means for controlling the heat collecting shoe being responsive to the timing means.

7. An apparatus according to claim 6, and means operating said timing means so that whenever the braking means are actuated the heat-collecting shoe is maintained in operative position for a predetermined time interval after the braking means moves out of operative relation with the rotational component.

8. Apparatus according to claim 6, wherein the control means for the braking means comprises a hydraulic circuit and the means controlling the shoe is a hydraulic control connected to the said circuit via a pressure restrictor, said timing means comprising a chamber of variable volume connected as a shunt to the hydraulic control of the heat-collecting shoe, and a piston in said chamber which moves against elastic means in cooperation with a leakage passage.

9. Apparatus according to claim 6, wherein the control means for the braking means comprises a hydraulic circuit and the means controlling the shoe is a hydraulic control connected to said circuit via a pressure restrictor, the timing means comprising an electromagnet with a plunger core, the plunger core being coupled to a valve of the pressure restrictor and said electromagnet having a feed controlled by a bellows of calibrated leakage associated with said plunger core.

* * * * *